United States Patent
Oliver et al.

(10) Patent No.: US 8,612,523 B1
(45) Date of Patent: Dec. 17, 2013

(54) METHODS AND APPARATUS FOR DETECTING BOTNET ATTACKS

(75) Inventors: Jonathan James Oliver, Kew (AU); Yun-Chian Cheng, Merced, CA (US)

(73) Assignee: Trend Micro Incorporated, Tokyo (JP)

( * ) Notice: Subject to any disclaimer, the term of this patent is extended or adjusted under 35 U.S.C. 154(b) by 1672 days.

(21) Appl. No.: 11/805,464

(22) Filed: May 22, 2007

(51) Int. Cl.
*G06F 15/16* (2006.01)

(52) U.S. Cl.
USPC .......................................... 709/206; 726/22

(58) Field of Classification Search
USPC .......................................................... 709/206
See application file for complete search history.

(56) References Cited

U.S. PATENT DOCUMENTS

| | | | |
|---|---|---|---|
| 2006/0095521 A1* | 5/2006 | Patinkin .......................... | 709/206 |
| 2006/0168006 A1* | 7/2006 | Shannon et al. ............... | 709/206 |
| 2008/0008348 A1* | 1/2008 | Metois et al. .................. | 382/100 |
| 2008/0127340 A1* | 5/2008 | Lee ................................. | 726/22 |
| 2008/0256619 A1* | 10/2008 | Neystadt et al. ............... | 726/11 |

OTHER PUBLICATIONS

Aleksander Kolcz, Abdur Chowdhury and Joshua Alspector, "The Impact of Feature Selection on Signature-Driven Spam Detection", 8 sheets, CEAS 2004.
Evan Cooke, Farnam Jahanian, and Danny McPherson, "The Zombie Roundup: Understanding, Detecting, and Disrupting Botnets", pp. 39-44, 2005 Proceesings of SRUTI Workshop (Step to Reducing Unwanted Traffic on the Internet).
Pump-and-Dump Spam Surge Linked to Russian Bot Herders from eWeek website, pp. 1-2 [retrieved on Apr. 4, 2007] [retrieved from the internet: <http://www.eweek.com/print_article2/0,1217,a=194218,00.asp>.
Spam Trojan Installs Own Anti-Virus Scanner from eWeek website, pp. 1-2, [retrieved on Apr. 4, 2007] [retrieved from the internet: <http://www.eweek.com/print_article2/0,1217,a=191975,00.asp>.
Champskud J. Skrepth and Andreas Uhl, "Robust Hash Functions for Visual Data: An Experimental Comparision", 2001, Carinthia Tech Institute, School of Telematics & Network Engineering and Paris-London-University Salzburg, Department of Scientific Computing.
Longest Common Subsequence Problem from Wikipedia, the free encyclopedia, Mar. 14, 2007, pp. 1-5 [retrieved on Apr. 5, 2007] [retrieved from the internet:<http://en.wikipedia.org/wiki/Longest_common_subsequence_problem>.
Jeff Chan, "SURBL—Quick Start", Feb. 2, 2007, pp. 1-5 [retrieved on Apr. 5, 2007] [retrieved from the internet:<http://www.surbl.org/quickstart.html>.
The Spamhaus Project from Spamhaus website, 2007, pp. 1-2 [retrieved on Apr. 5, 2007] [retrieved from the internet:<http://www.spamhaus.org/>.

\* cited by examiner

*Primary Examiner* — John Follansbee
*Assistant Examiner* — Glenford Madamba
(74) *Attorney, Agent, or Firm* — Okamoto & Benedicto LLP

(57) ABSTRACT

Botnet attacks may be detected by collecting samples of spam messages, forming clusters of related spam messages, and identifying the source or sources of the related spam messages. The related spam messages may be identified as those generated using the same template. For example, spam messages generated using the same image template, text template, or both may be deemed as related. To find related spam messages, images of spam messages may be extracted and compressed using a lossy compression algorithm. The compressed images may then be compared to one another to identify those generated using the same image template. The lossy compression algorithm may involve dividing an image into several blocks and then computing a value for each block for comparison.

27 Claims, 8 Drawing Sheets

Make it huge with Nanotechnology!

When we examine global economic development on a timeline we can see periods where certain business sectors have been the focus of an economic boom. Getting in at the right time is essential. Many experts today believe that nanotechnology will be the next booming industry. With this in mind we would like to introduce you to our next winner.

Company: Nano Superlattice Technology, Inc.
Symbol: NSLT
Current Price: $0.18
Short-Term Target: $0.58
Long-Term Target: $5.58

With the increased miniaturization of personal electronics devices current tools are reaching their limits. Nano Superlattice Technology Inc. is a nanotechnology company engaged in the coating of tools and components with nano structured PVD coatings for high-tech industries. NSLT uses Superlattice technology to apply multi-layers of super-hard elemental coatings on an array of precision products to achieve a variety of physical properties. An amazing revelation is set to come out of the Nano labs which will have an enormous impact on the manufacturing world.

Seize the day and get in before the news is out!

FIG. 6
(PRIOR ART)

Subject: Short 30 second form

To: jjbwb@trendmicro.com

From: "Herminia Sharpe" <akstcgdsengmnsdgs@gdseng.com>

Date: Tue, 21 Nov 2006 05:43:44 -0060

Thank you for your loan request, which we recieved yesterday, your refinance application has been accepted Bad credit OK, We are ready to give you a $318,000 loan, after further review, our lenders have established the lowest monthly payments.

Approval process will take only 1 minute.

Please visit the confirmation link below and fill-out our short 30 second Secure Web-Form www.directtrusts.com

FIG. 7

(PRIOR ART)

METHODS AND APPARATUS FOR DETECTING BOTNET ATTACKS

BACKGROUND OF THE INVENTION

1. Field of the Invention

The present invention relates generally to computer security, and more particularly but not exclusively to techniques for combating botnets.

2. Description of the Background Art

E-mail provides a convenient, fast, and relatively cost-effective way of sending messages to a large number of recipients. It is thus no wonder that solicitors, such as spammers, use e-mail to indiscriminately send messages to e-mail accounts accessible over the Internet. These unsolicited e-mails, also referred to as "junk mail" or "spam", are not only a nuisance, but also translate to lost time and money as employees or home users are forced to segregate them from legitimate e-mails.

"Bots" are stealthy, remotely-controllable unauthorized software programs running quietly in user computers. A bot can receive and execute instructions from a remote server computer operated by the bot's originator, which is also referred to as a "bot herder." A bot may also be pre-programmed to perform a function without additional instructions from a bot herder. A network of bots is called a "botnet." A bot may be configured to use the infected computer to send spam. Computers can be infected by bots via several different methods including virus infection, drive-by-web-downloads and spyware downloaders that install other software onto a computer. Most users don't even know their computers have been hijacked and have become part of a botnet that sends spam messages.

Cooke et. al. ("The Zombie Roundup: Understanding, Detecting, and Disrupting Botnets," pages 39-44 of the 2005 Proceedings of SRUTI Workshop (Steps to Reducing Unwanted Traffic on the Internet)) describe three approaches to combating botnets, namely, (1) preventing systems from being infected in the first place, (2) directly detecting botnet command and control traffic, and (3) detecting secondary features of a bot infection such as propagation or attacks. The first and second approaches are ideal if they can be achieved. However, there are many situations where the first and second approaches may not be feasible, such as when the botnet comprises computers outside the control of the person or entity trying to eradicate the botnet. In that case, the third approach may be more feasible. However, effective techniques for selecting secondary features of bot infection and detecting these secondary features are heretofore unrealized.

SUMMARY

In one embodiment, botnet attacks may be detected by collecting samples of spam messages, forming clusters of related spam messages, and identifying the source or sources of the related spam messages. The related spam messages may be identified as those generated using the same template. For example, spam messages generated using the same image template, text template, or both may be deemed as related. To find related spam messages, images of spam messages may be extracted and compressed using a lossy compression algorithm. The compressed images may then be compared to one another to identify those generated using the same image template. The lossy compression algorithm may involve dividing an image into several blocks and then computing a value for each block for comparison.

These and other features of the present invention will be readily apparent to persons of ordinary skill in the art upon reading the entirety of this disclosure, which includes the accompanying drawings and claims.

DESCRIPTION OF THE DRAWINGS

FIG. 6 shows an example image of a spam.

FIG. 7 shows an example spam.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
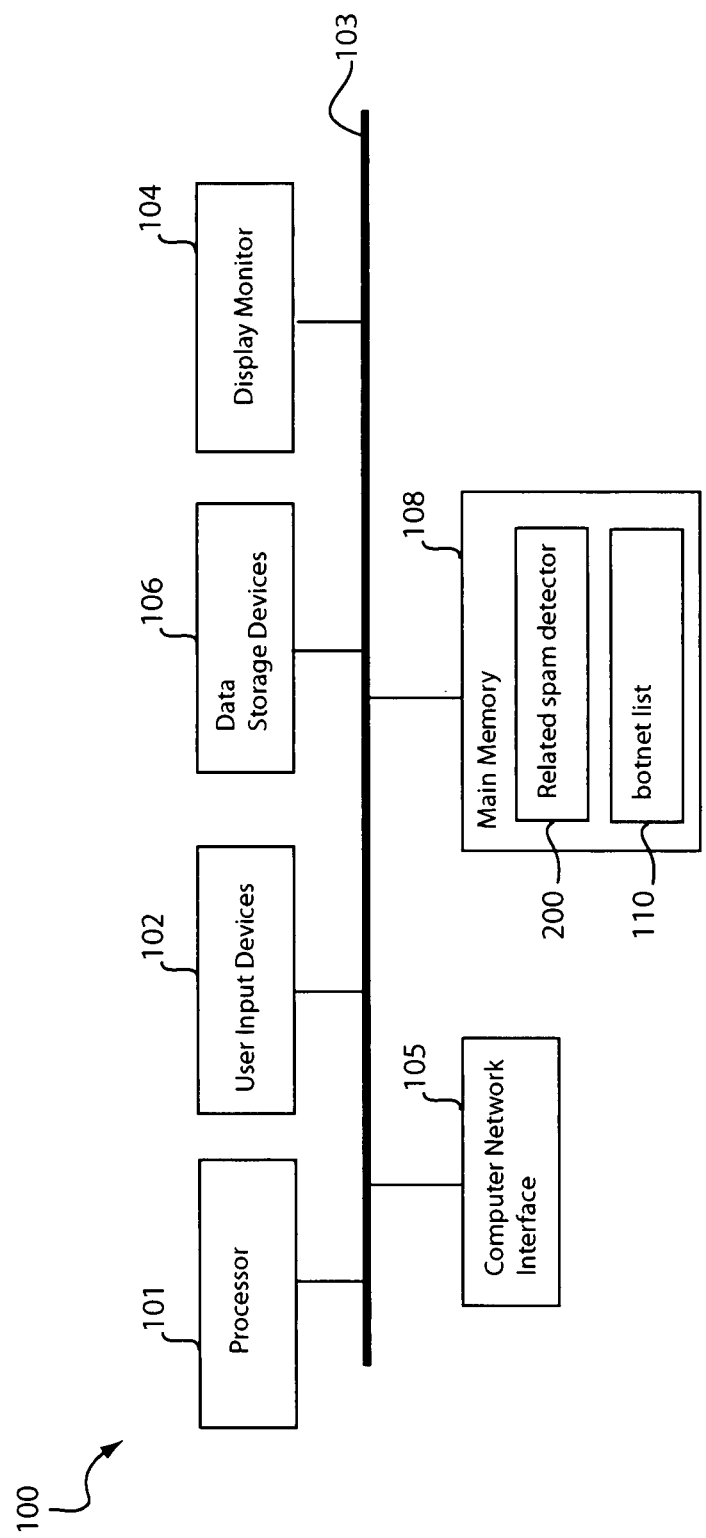
FIG. 1 shows a schematic diagram of a computer in accordance with an embodiment of the present invention.

FIG. 1 shows a schematic diagram of a computer 100 in accordance with an embodiment of the present invention. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). In the example of FIG. 1, the main memory 108 includes a related spam detector 200 and a botnet list 110. The related spam detector 200 and the botnet list 110 may be loaded from a data storage device 106 to the main memory 108 for execution or reading by the processor 101.

The related spam detector 200 may comprise computer-readable program code for detecting a group of computers acting in a coordinated way to send spam. In one embodiment, the related spam detector 200 may be configured to find related spam messages, to group related spam messages into clusters, and to identify the source or sources of spam messages in a cluster. For purposes of the present disclosure, spam messages may be deemed related if they likely have been generated using the same template, either the same image template, text template, or both. Looking for spam messages likely to have been generated using the same template, rather than merely looking for the same theme, is advantageous in that bots in a botnet typically receive a template that each bot may modify to avoid detection by conventional anti-spam programs. Establishing that spam messages are likely to have been generated by the same spam template may thus allow for identification of coordinated spamming activity of bots in a botnet. In other words, a template may serve as a common object for identifying the handiwork of a botnet.

The related spam detector 200 may detect botnet attacks in multiple levels of granularity. For example, in coarse granularity, the related spam detector 200 may be employed to determine a list of computers sending related spam messages. In fine granularity, the related spam detector 200 may be employed to determine a list of computers sending related spam messages that have further similarities, such as being sent at similar times, coming from the same IP block, or having geographically related sources.

The related spam detector 200 may be employed to determine whether a plurality of spam messages may be part of a coordinated botnet attack, even when the spam messages are from different sources. This is in contrast to techniques that merely identify the source of particular spam messages. Knowing that a group of computers is acting in a coordinated way to send spam is beneficial for a number of reasons including (a) making the maintenance of blacklists of computers more accurate because it is easier to establish that an attack has started (or stopped) from a group of say 512 computers than for a single computer and (b) when establishing that someone or something has performed some action, it is more compelling to establish that 512 computers (or even 70,000 computers) acted in the same coordinated manner during some period.

The botnet list 110 may comprise data indicative of computers that have been hijacked to become part of a botnet. The botnet list 110 may be populated by the related spam detector 200 upon identification of computers belonging to a botnet. As will be more apparent below, the botnet list 110 may be employed as a security measure against a variety of botnet attacks including spamming, directory harvesting, denial of service, fishing, etc. The botnet list 110 may include the network addresses (e.g., IP addresses) and other information of computers identified as belonging to a botnet.

Figure 2:
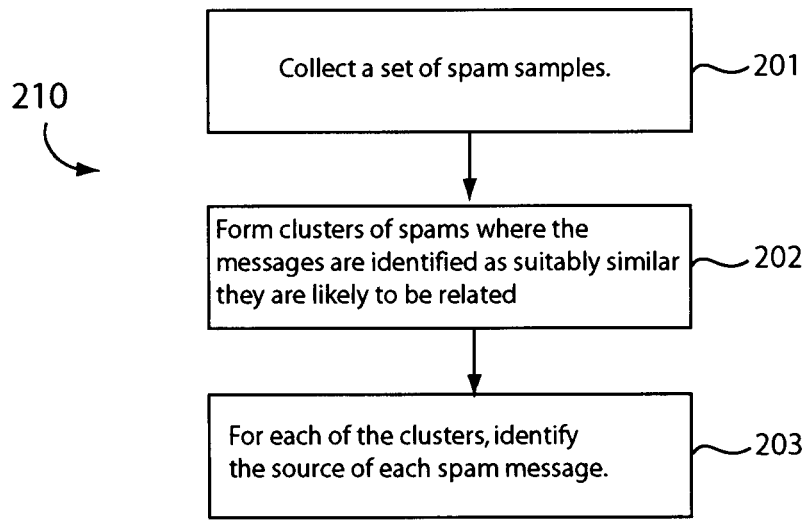
FIG. 2 shows a flow diagram of a method of detecting a botnet attack in accordance with an embodiment of the present invention.

FIG. 2 shows a flow diagram of a method 210 of detecting a botnet attack in accordance with an embodiment of the present invention. The method 210 is explained using the components of the computer 100. Other components may also be used without detracting from the merits of the present invention.

In step 201, a set of spam samples is collected. The spam samples may be those identified by another program (not shown) as spam, manually identified as spam, or received at a honeypot account that was specially set up for the purposes of collecting spam. For example, an anti-spam program may be run in a mail server to identify and collect samples of spam.

In step 202, the related spam detector 200 analyzes the spam samples to identify those that are suitably similar that they are likely to be related, and group related spam messages into clusters. For example, the detector 200 may go through the spam samples and identify those that are likely to be from the same image template, text template, or both. By looking for messages which are likely to have been generated by the same template, rather than particular images or texts, the detector 200 advantageously identifies spam messages likely to have been sent using a botnet. This is because bots in a botnet typically send spam having contents based on a template. Use of the template allows the bots to vary the spam message to evade conventional anti-spam programs. The detector 200 takes advantage of this and looks for messages likely to have been generated using the template to identify spam messages likely to have been sent by a botnet. The detector 200 groups each set of related spam messages from the sample into a cluster.

In step 203, the related spam detector 200 identifies the source of each spam message in each of the cluster. For example, for related spam messages in a cluster, the detector 200 may identify the IP addresses and other network connection information including time stamps, and the like.

Alternatively, the appropriate hashes and identification of spam sources may be performed upon collection in step 201 rather than in a separate step 203. In that case, sources of related spam messages are already known when the related spam messages are grouped into clusters in step 202.

Figure 3:
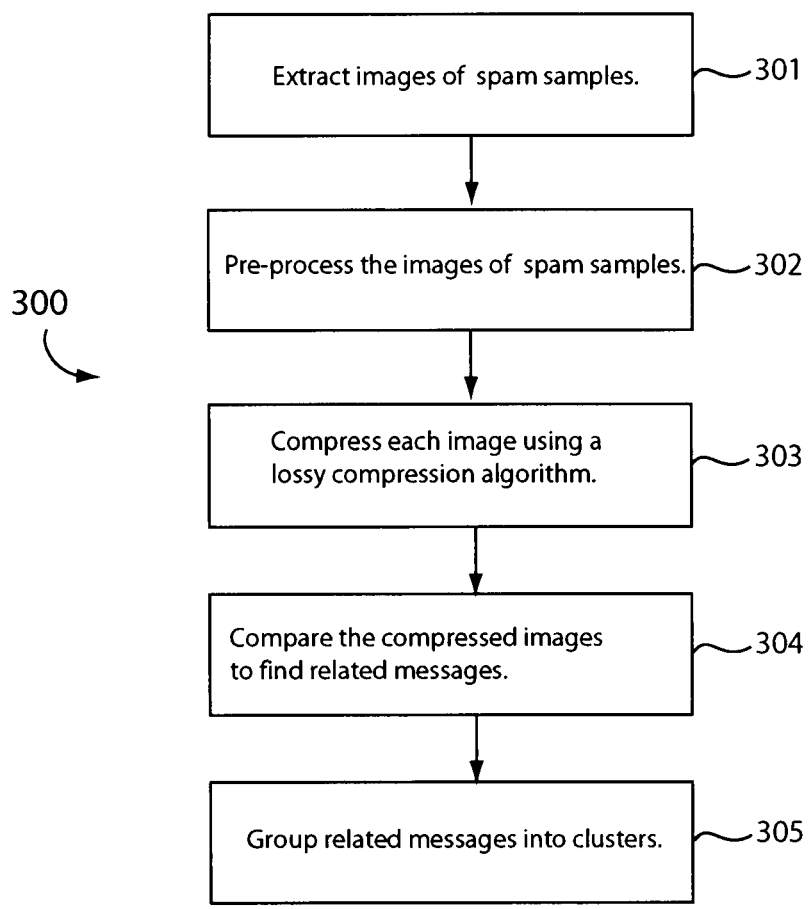
FIG. 3 shows a flow diagram of a method of identifying related spam messages in accordance with an embodiment of the present invention.

FIG. 3 shows a flow diagram of a method 300 of identifying related spam messages in accordance with an embodiment of the present invention. The method 300 may be employed to perform the step 202 of FIG. 2. The method 300 is explained using the components of the computer 100 as an example. Other components may also be used without detracting from the merits of the present invention. The method 300 may be employed to identify related spam messages that have embedded images. This is particularly useful as most spam messages now use images to evade text-based anti-spam algorithms. An example of such a spam message is shown in FIG. 6.

A similar method for analyzing images is also disclosed in commonly-assigned U.S. patent application having the Ser. No. 11/617,603, filed on Dec. 28, 2006, by Jonathan J. Oliver and Yun-Chian Chang, entitled "Image Detection Methods and Apparatus," which is incorporated herein by reference in its entirety.

In step 301, the related spam detector 200 extracts the images of spam samples.

In step 302, the detector 200 pre-processes the images of the spam samples. The pre-processing of the images advantageously simplifies the images, making them easier to compress and analyze. Pre-processing also helps remove anti-detection modifications performed on the image template.

For example, each image may undergo fundamental extraction, be converted to gray-scale and/or cropped as part of the image processing. Fundamental extraction refers to the process of identifying color/texture employed to present the fundamental image. Once the image has been identified, the contrast between the image and other image information may be exaggerated such that, for example, the image is in one color and all other parts of the image are muted for contrast. In this manner, information that results from changes to non-fundamental aspects of the image is essentially removed after the fundamental extraction.

Converting the image to gray-scale also has the effect of substantially removing or attenuating the contributions made by minor changes to the image color and also simplifies the image for the subsequent conversion since fewer information is required to represent an image in gray-scale compared to color.

Cropping refers to the removal of at least a portion of the periphery of the image such that the contributions made by changing the borders or dimensions of the image template are effectively negated. Different cropping strategies may be employed. For example, the image may be cropped to a fixed size to remove its border, or image analysis may be performed to ascertain the image area likely to contain the image template, thereby enabling the rest of the image to be cropped.

Instead of gray-scaling, the image may be converted to a form that employs fewer bits per pixel (lower color bit conversion) such that the image, while still in color, may be represented by fewer bits of information. Other pre-processing techniques for simplifying an image to minimize the effect of changes to the image template and make it easier to analyze the image may also be used, including normalizing the overall image intensity to negate the effects of darkening or lightening modifications. It should be noted that pre-processing may not be required depending on the specifics of the application.

In step 303, the detector 200 compresses the images using a lossy compression algorithm. As its name implies, a lossy compression algorithm performs data compression on an image where the resulting compressed image is represented using fewer information or bits of data. Lossy compression simplifies the images and removes noise due to minor modifications to the image template, making the images easier to compare to one another. In one embodiment, the lossy compression algorithm involves dividing an image into blocks of images and then determining a value for each block. Images having the same or substantially the same values in one or more blocks may be deemed as being generated using the same template. An example of such a lossy compression algorithm for detecting images likely to have been generated using the same image template is later described with reference to FIG. 4. Other lossy compression algorithms may also be used, including JPEG compression (a compression standard promulgated by the Joint Photographic Experts Group).

In step 304, the detector 200 compares the compressed images to find related spam messages. For example, the detector 200 may compare the compressed images to find those likely to have been generated using the same image template. The spam messages with images generated using the same image template may be deemed as related spam messages and grouped into a cluster of spam messages. One way to do this is to form a hash of the compressed images for two images. If the hashes have the same value, then they are deemed to have been generated by the same template.

In step 305, the detector 200 groups related messages into clusters. For example, the detector 200 may form a plurality of clusters, with each cluster having messages with images deemed to have been generated using the same image template.

Figure 4:
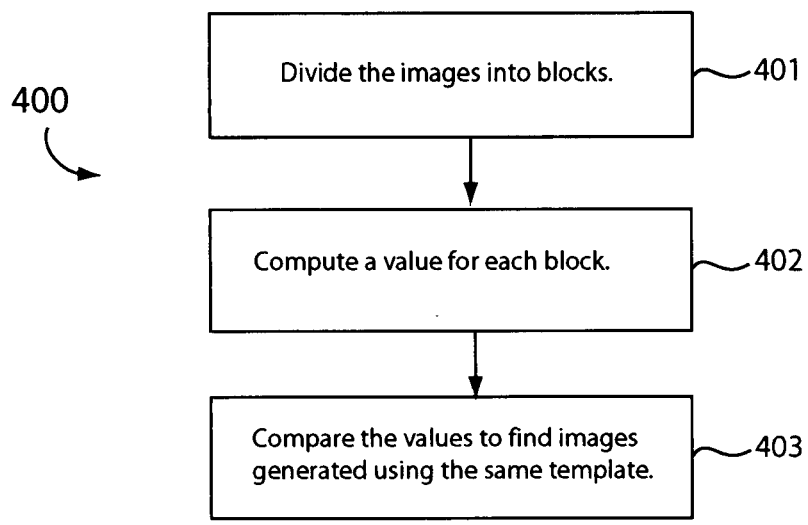
FIG. 4 shows a flow diagram of a method of finding images generated using the same image template in accordance with an embodiment of the present invention.

FIG. 4 shows a flow diagram of a method 400 of finding images generated using the same image template in accordance with an embodiment of the present invention. The detector 200 may employ the method 400 to find images deemed to have been generated from the same image template, and thus related spam messages.

Figure 5:
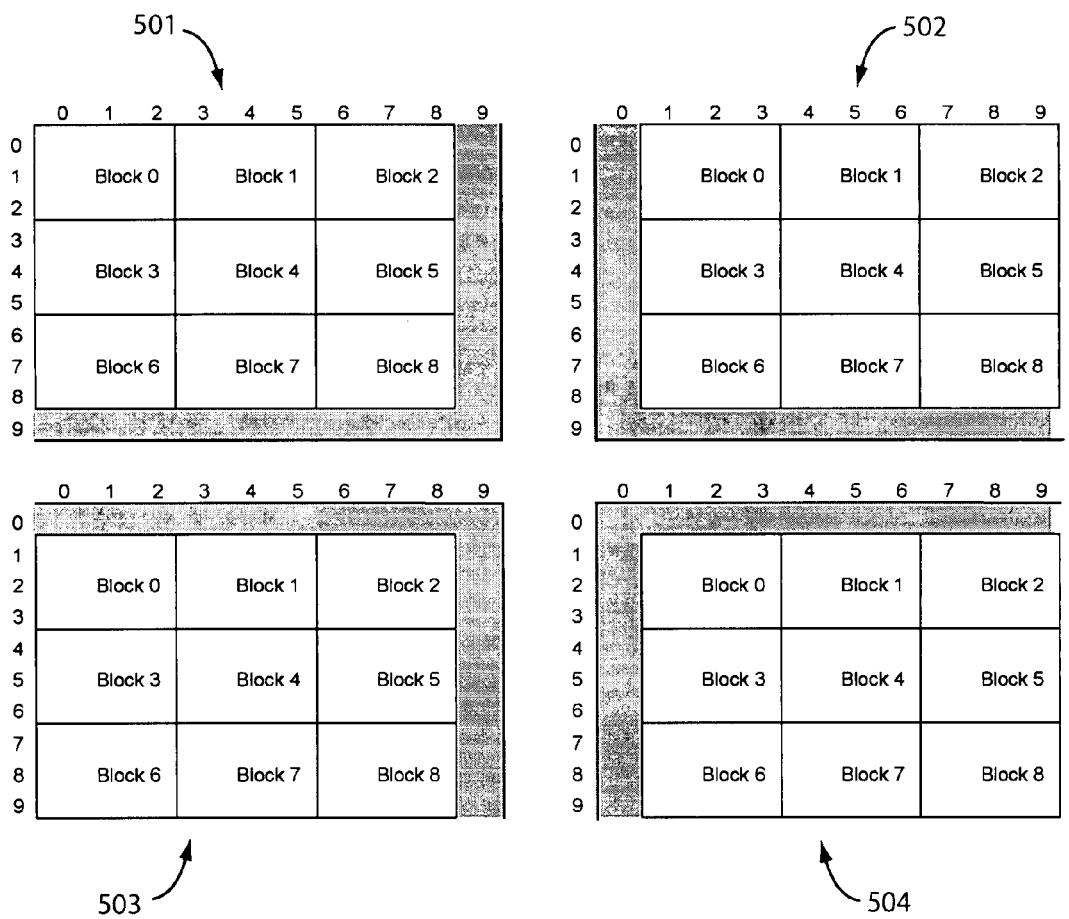
FIG. 5 schematically illustrates various ways of dividing an image into blocks in accordance with an embodiment of the present invention.

In step 401, the detector 200 divides each image into blocks. In one embodiment, each image is divided into blocks of N×M pixels, where N is a row and M is a column. For example, as shown in FIG. 5, an image 501 of 10×10 pixels may be divided into 9 blocks, with each block having 9 pixels (i.e., a block of 3×3 pixels). Pixels in row 9 and column 9 have been cropped out in the image 501. An image 502 is the same as the image 501 except that the pixels in row 9 and column 0 have been cropped out. Similarly, pixels in row 0 and column 9 have been cropped out in an image 503, while pixels in row 0 and column 0 have been cropped out in an image 504.

In step 402, the detector 200 computes a value for each of the blocks of each image. For example, a median (or mean, average, or other statistical measure or mathematical representation) may be computed for each block, resulting in a matrix of values representing each image. In one embodiment, the detector 200 computes a hash value for each block of each image.

In step 403, the detector 200 compares the values of the blocks to find those generated using the same image template. In one embodiment, two or more images are deemed to have been generated using the same image template when the hash of the concatenation of their blocks take the same value.

In one study, using the method 300 on 2094 spam messages resulted in clusters of related spam messages. The number of related spam messages in individual clusters having ten or more related spam messages in the study is shown in Table 1.

TABLE 1

| Size of Cluster | Size of Cluster |
|---|---|
| 10 | 94 |
| 11 | 95 |
| 13 | 142 |
| 16 | 160 |
| 39 | 209 |
| 45 | 244 |
| 67 | 252 |

In the example of Table 1, there are two clusters having 16 related spam messages. A minimum number of related spam messages in a cluster may be set before deeming that a coordinated spam attack has occurred. In the example of Table 1, the cluster with 95 spam messages has variants of the image of FIG. 6. The dimensions of the images of the 95 spam messages are shown in Table 2.

TABLE 2

| | | | | |
|---|---|---|---|---|
| 555 x 349 | 564 x 349 | 572 x 339 | 575 x 361 | 582 x 342 |
| 556 x 361 | 564 x 363 | 572 x 350 | 576 x 349 | 582 x 352 |
| 559 x 344 | 566 x 343 | 572 x 357 | 576 x 350 | 583 x 348 |
| 559 x 352 | 566 x 352 | 572 x 357 | 576 x 350 | 583 x 352 |
| 559 x 357 | 566 x 353 | 572 x 370 | 576 x 352 | 583 x 362 |
| 559 x 359 | 566 x 362 | 573 x 347 | 576 x 357 | 583 x 368 |
| 560 x 348 | 566 x 365 | 573 x 354 | 576 x 364 | 584 x 360 |
| 561 x 353 | 567 x 347 | 574 x 341 | 577 x 350 | 584 x 368 |
| 561 x 356 | 567 x 367 | 574 x 343 | 577 x 353 | 586 x 366 |
| 561 x 368 | 569 x 341 | 574 x 344 | 577 x 356 | 586 x 368 |
| 562 x 350 | 569 x 348 | 574 x 350 | 577 x 365 | 586 x 372 |
| 562 x 357 | 570 x 342 | 574 x 350 | 577 x 365 | 588 x 348 |
| 562 x 359 | 570 x 343 | 575 x 341 | 578 x 348 | 588 x 365 |
| 562 x 361 | 570 x 343 | 575 x 348 | 579 x 364 | 590 x 352 |
| 563 x 350 | 570 x 353 | 575 x 351 | 579 x 372 | 592 x 350 |
| 563 x 352 | 570 x 358 | 575 x 354 | 580 x 342 | |
| 563 x 357 | 571 x 355 | 575 x 354 | 580 x 345 | |
| 563 x 358 | 571 x 357 | 575 x 355 | 580 x 348 | |
| 563 x 364 | 571 x 362 | 575 x 357 | 580 x 360 | |
| 564 x 338 | 571 x 366 | 575 x 360 | 581 x 344 | |

Even with the varying dimensions, the method 300 is able to find the images having the same template as that of FIG. 6 using the lossy compression algorithm of the method 400.

After finding a cluster of related messages, additional related messages that should belong in the same cluster may be found using a solution to the so-called "Longest Common Subsequence Problem" (e.g., see <http://en.wikipedia.orgi-wiki/Longest_common_subsequence_problem>). For example, for each cluster of related messages, the longest common substring of pixel values or features that represent transformed pixel values may be extracted and compared to the longest common substring of pixel values or features of images in other clusters to find additional images that may have been generated using the same image template.

Additional sources of spam messages may be identified from reports generated by a receiving mail server. For example, the receiving mail server may generate hashed summaries and a label identifying the mail server (e.g., by IP address) from which email traffic originates. In that case, after establishing that an originating mail server is sending out spam messages, the method 300 may be performed on emails from the originating mail server to determine whether the originating mail server is sending out emails using the same image template. This allows building of a listing of IP addresses of originating mail servers that send out spam deemed to have been generated from the same image template and are thus likely part of the same botnet.

As another example, a receiving mail server may generate time stamps and a label identifying the mail server (e.g., by IP address) from which email traffic originates. In that case, it would be advantageous to search for IP addresses of originating mail servers that send out bursts of spam messages. The bursts of spam messages may be correlated to clusters of related spam messages found using the method 210.

Related spam messages may also be identified by finding those deemed to have been generated using the same text template. For example, Kol Kolcz et. al. (see "The Impact of Feature Selection on Signature-Driven Spam Detection". Aleksander Kolcz, Abdur Chowdhury and Joshua Alspector. CEAS 2004.) describes an approach that involves extracting an ordered list of common words from each spam. For example, in a sample of 60 copies of the spam of FIG. 7, extracting an ordered list of common words from each of the spam allows mapping of the spam messages to the same hash value for all of the spam messages even though they are slightly different from one another. This approach is particularly effective in spam messages that do not vary much from the text template. In the 60 copies of the spam message of FIG. 7, the spam messages vary only in the headings and the amount of the loan (e.g., "We are ready to give you a $374,000 loan" versus "We are ready to give you a $318,000 loan.").

As can be appreciated, embodiments of the present invention may be employed to find clusters of spam messages that may have been generated using the same template. This is in contrast to conventional approaches that merely look for spam messages that have similar themes. Examples of these conventional approaches include looking for similar embedded URLs (e.g., see <www.surbl.org>), examining the IP addresses of the sending server (e.g., see <www.spamhaus.org>), or looking for Stock Market Ticker symbols in spam messages. These conventional approaches identify spam without establishing that particular groups of spam messages may have been generated using the same template and are consequently not very effective in identifying coordinated attacks.

Figure 8:
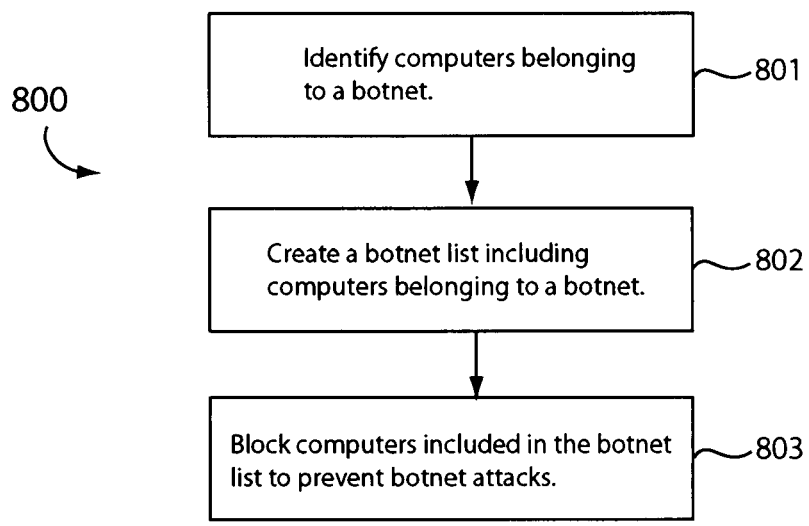
FIG. 8 shows a flow diagram of a method of combating botnet attacks in accordance with an embodiment of the present invention.

Referring now to FIG. 8, there is shown a flow diagram of a method 800 of combating botnet attacks in accordance with an embodiment of the present invention. The method 800 is explained using the components shown in FIG. 1 for illustration purposes only.

In step 801, computers belonging to a botnet are identified. For example, computers belonging to a botnet may be identified by finding related spam messages and identifying the sources of those messages as in the method 210 of FIG. 2.

In step 802, computers identified as belonging to a botnet may be included by the detector 200 in the botnet list 110. For example, the detector 200 may include in the botnet list 110 the IP addresses (i.e., Internet Protocol addresses) of computers identified as sending out related spam messages. The botnet list 110 may include individual full IP addresses in the case where the computers forming the botnet are in unrelated network locations. The botnet list 110 may also include subnets where appropriate, as is the case when the bot herder hijacks computers belonging to a subnet for ease of control and infection.

In step 803, computers included in the botnet list 110 are blocked to prevent botnet attacks. As can be appreciated, the botnet list 110 may be propagated to other computers for use in combating botnets in general. For example, the botnet list 110 or information included therein may be provided to a firewall to restrict network access. The firewall may automatically block HTTP (Hyper Text Transfer Protocol) requests from computers indicated in the botnet list 110 to prevent denial of service attacks and probing to gain unauthorized network access or to spread malware infection. A web browser may consult the botnet list 110 to prevent Internet communications with a server whose IP address is in the botnet list 110 to prevent phishing. A mail server may consult the botnet list 110 to deny email communications (e.g., SMTP communications) with computers performing directory harvest and spamming. The botnet list 110 or data or information obtained using the techniques disclosed herein may also be used to combat botnets in other ways without detracting from the merits of the present invention.

Figure 9:
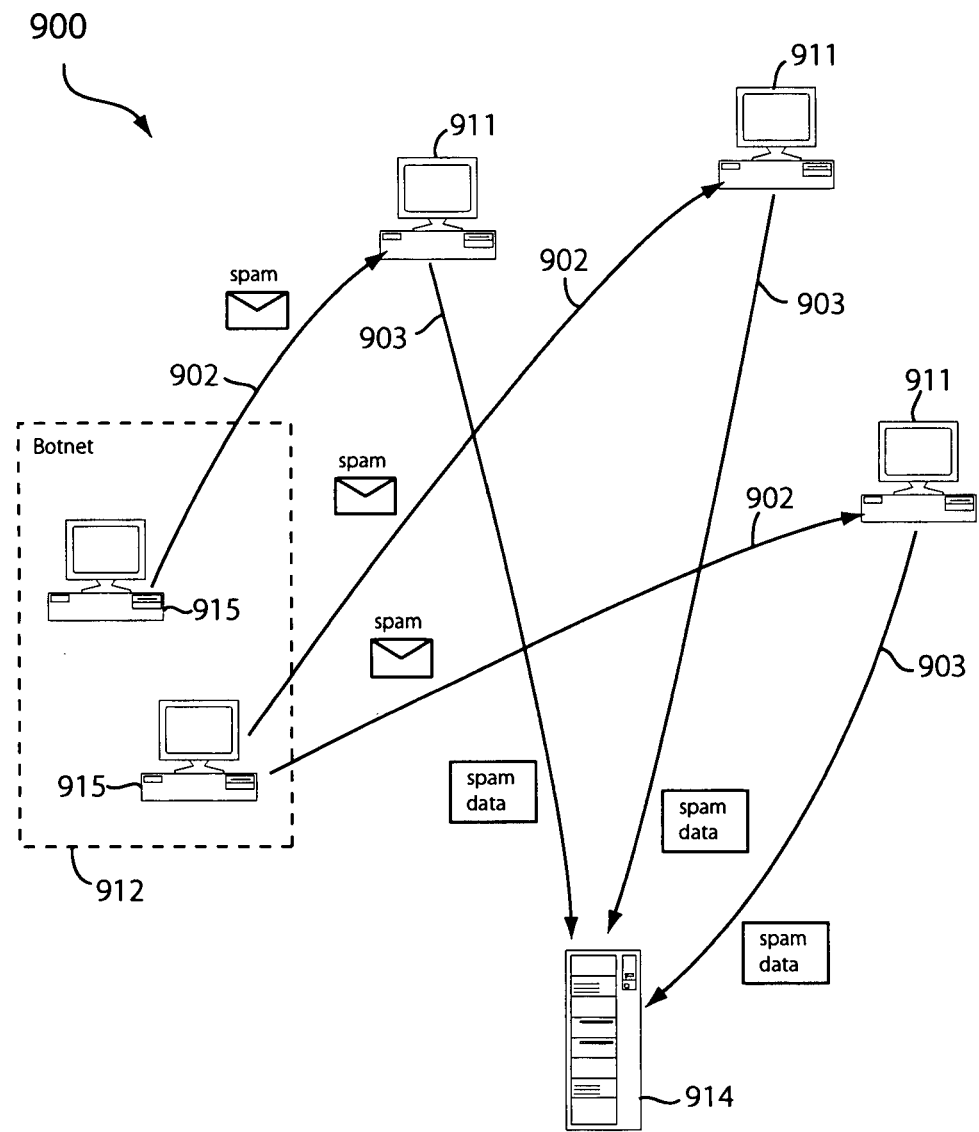
FIG. 9 shows a system for detecting botnet attacks in accordance with an embodiment of the present invention.

FIG. 9 schematically shows a system 900 for detecting botnet attacks in accordance with an embodiment of the present invention. In the example of FIG. 9, the system 900 includes a server computer 914 and a plurality of client computers 911. The server computer 914 and the client computers 911 may each include a related spam detector, with the related spam detector (e.g., 200 in FIG. 1) in each computer performing one or more portions of the method 210 (FIG. 2). The computers shown in FIG. 9 may communicate over a computer network, such as the Internet.

As shown in FIG. 9, a botnet 912 comprising bots in each of a plurality of computers 915 may send spam messages to the client computers 911 (arrows 902). The client computers 911 may identify and collect spam samples received from a variety of sources including the botnet 912. In the example of FIG. 9, each client computer 911 uses its related spam detector to collect a set of spam samples (FIG. 2, step 201), identify the source of each spam sample (e.g., extract IP addresses), and take a hash of the image and text content of each spam. The hash of the image may be taken using a lossy compression algorithm, while the hash of the text content may be taken by extracting an ordered list of common words from the spam, for example. Each client computer 911 may send the resulting spam data to the server computer 914 (arrows 903). Each spam data may include (a) IP addresses extracted from a spam message, (b) a hash of the image of the spam message, and (c) a hash of the text content of the spam message. Each spam data may also include additional information depending on implementation.

The related spam detector of the server computer 914 collects the spam data from the client computers 911 and forms clusters of spam data having image content, text content, or both that are suitably similar that they are likely to have been generated using the same template (step 202 of FIG. 2). For each cluster, the related spam detector of the server computer 914 identifies the source of the spam message represented by the spam data (step 203 of FIG. 2). In this case, the source IP address is already included in the spam data as received from a client computer 911. This results in the IP addresses of the computers 915 being grouped together in a cluster, allowing identification of the computers 915 as belonging to the same botnet 912. That is, the spam messages from the computers 915 may be detected as a coordinated attack from the botnet 912.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method to be performed using a computer, the method comprising:
    collecting a set of spam messages;
    extracting images from the spam messages;
    analyzing the extracted images by comparing the extracted images to one another to identify those generated using a same image template;
    forming clusters of related spam messages, each of the cluster of related spam messages comprising spam messages from the set of spam messages having images generated using a same image template; and
    identifying sources of spam messages in each of the clusters of related spam messages.

2. The method of claim 1 wherein analyzing the extrated images comprises:
    compressing each of the extracted images using a lossy compression algorithm; and
    comparing the compressed images to one another to find those generated using a same image template.

3. The method of claim 2 further comprising performing pre-processing on each extracted image to simplify the extracted image prior to compression.

4. The method of claim 3 wherein the pre-processing comprises gray-scale conversion.

5. The method of claim 2 wherein the lossy compression algorithm comprises JPEG compression.

6. The method of claim 2 wherein the lossy compression algorithm comprises:
    dividing each of the extracted images into a plurality of blocks; and
    computing a value for each block in the plurality of blocks.

7. The method of claim 6 further comprising:
    comparing values of blocks of the extracted images to find images generated using a same image template.

8. The method of claim 6 further comprising:
    cropping each of the extracted image to conform the extracted image to a predetermined dimension.

9. The method of claim 1 wherein identifying the source of the spam messages in each of the clusters of related spam messages comprises identifying IP addresses of computers that sent the spam messages.

10. A computer having a main memory and a processor configured to execute computer-readable program code in the main memory, the main memory comprising:
    a detector comprising computer-readable program code configured to identify related spam messages generated using a same template, to group the related spam messages into a separate cluster, and to identify the source or sources of the related spam messages in the cluster.

11. The computer of claim 10 wherein the related spam messages are generated using a same text template.

12. The computer of claim 10 wherein the detector is configured to identify IP addresses of the related spam messages.

13. The computer of claim 10 wherein the related spam messages are generated using a same image template.

14. The computer of claim 13 wherein the detector identifies related spam messages by extracting images from the related spam messages, compressing the extracted images using a lossy compression algorithm, and comparing the compressed images to identify those generated using the same image template.

15. The computer of claim 14 wherein the lossy compression algorithm comprises JPEG compression.

16. The method of claim 14 wherein the lossy compression algorithm comprises:
    dividing each of the extracted images into a plurality of blocks;
    computing a value for each block in the plurality of blocks; and
    comparing values of the plurality of blocks to identify images generated using the same image template.

17. A method to be performed using a computer, the method comprising:
    collecting a set of spam messages;
    forming clusters of related spam messages, each of the cluster comprising spam messages from the set of spam messages identified as generated using a same template; and
    identifying sources of spam messages in each of the clusters.

18. The method of claim 17 wherein the related spam messages are identified as generated using a same template by extracting images from the related spam messages, compressing the extracted images using a lossy compression algorithm, and comparing the compressed images to one another to find those generated using a same image template.

19. The method of claim 18 wherein the lossy compression algorithm comprises: dividing the extracted images into a plurality of blocks; and
    computing a value for each block in the plurality of blocks.

20. The method of claim 19 further comprising:
    comparing values of blocks of the extracted images to find images generated using the same image template.

21. A method to be performed using a computer, the method comprising:
    identifying computers belonging to a botnet by identifying sources of spam messages that have been generated using a same template;
    including information about the computers in a list; and
    blocking computers included in the list to prevent attacks from the botnet.

22. The method of claim 21 wherein blocking computers included in the list to prevent attacks from the botnet comprises:
    denying HTTP requests from computers included in the list.

23. The method of claim 21 wherein blocking computers included in the list to prevent attacks from the botnet comprises:
    denying email communications with computers included in the list.

24. The method of claim 21 wherein blocking computers included in the list to prevent attacks from the botnet comprises:
    configuring a firewall to deny network access to computers included in the list.

25. A system for detecting botnet attacks, the system comprising:
    a first set of computers, each computer in the first set of computers being configured to collect spam messages, to create spam data for each spam message, and to forward the spam data over a computer network; and
    a server computer configured to received spam data from the first set of computers, to group spam data of related spam messages deemed to have been generated from a same template into clusters, and to detect a botnet attack based on sources of the related spam messages in a particular cluster.

26. The system of claim 25 wherein the spam data comprise:
a source IP address for a particular spam message; and
a hash of an image included in the particular spam message.

27. The system of claim 26 wherein the spam data further comprise a hash of text content of the particular spam message.

* * * * *